United States Patent [19]

Hallmark et al.

[11] Patent Number: 4,758,607

[45] Date of Patent: * Jul. 19, 1988

[54] DISTILLED PRODUCTS OF POLYETHYLENE TEREPHTHALATE POLYMERS AND POLYCARBOXYLIC ACID-CONTAINING POLYOLS AND POLYMERIC FOAMS OBTAINED THEREFROM

[75] Inventors: Richard K. Hallmark, Largo; Ernest K. Moss, Clearwater, both of Fla.

[73] Assignee: Sloss Industries Corporation, Birmingham, Ala.

[*] Notice: The portion of the term of this patent subsequent to Sep. 10, 2002 has been disclaimed.

[21] Appl. No.: 756,107

[22] Filed: Jul. 18, 1985

[51] Int. Cl.4 .............................................. C08G 18/14
[52] U.S. Cl. ..................................... 521/172; 521/173; 521/48.5; 528/271; 427/373; 427/385.5; 427/387; 428/423.1
[58] Field of Search ................. 528/271; 521/172, 173, 521/48.5; 427/373, 385.5, 387; 428/423.1

[56] References Cited

U.S. PATENT DOCUMENTS

| | | | |
|---|---|---|---|
| 3,427,267 | 2/1969 | Stieger et al. | 260/22 |
| 3,647,759 | 3/1972 | Walker | 260/75 R |
| 4,100,354 | 7/1978 | Owen, Jr. | 560/89 |
| 4,223,068 | 9/1980 | Carlstrom et al. | 428/310 |
| 4,246,365 | 1/1981 | Wiedermann et al. | 521/172 |
| 4,259,478 | 3/1981 | Jackson, Jr. et al. | 528/307 |
| 4,346,229 | 8/1982 | Derr et al. | 560/91 |
| 4,417,001 | 11/1983 | Svoboda et al. | 521/114 |
| 4,469,824 | 9/1984 | Grigsby, Jr. et al. | 521/173 |
| 4,506,090 | 3/1985 | Brennan et al. | 560/91 |
| 4,536,522 | 8/1985 | Grigsby, Jr. et al. | 521/172 |
| 4,539,341 | 9/1985 | Hallmark et al. | 521/172 |
| 4,540,768 | 9/1985 | Speranza et al. | 528/79 |

*Primary Examiner*—John Kight
*Assistant Examiner*—M. L. Moore
*Attorney, Agent, or Firm*—James W. Grace; Charles W. Vanecek

[57] ABSTRACT

A storage stable polyester polyol mixture is prepared by
(a) digesting polyethylene terephthalate with a digesting medium comprising a polycarboxylic acid component-containing polyol derived from a digesting polycarboxylic acid component and a digesting polyol component to form a digested polyol mixture and liberate ethylene glycol from said polyethylene terephthalate, and
(b) distilling from said digested polyol mixture the amount of liberated ethylene glycol sufficient for improved storage stability of the mixture.

The polyester polyol mixture is useful in the preparation of cellular foam materials, particularly polyisocyanurate and polyurethane foams.

22 Claims, 1 Drawing Sheet

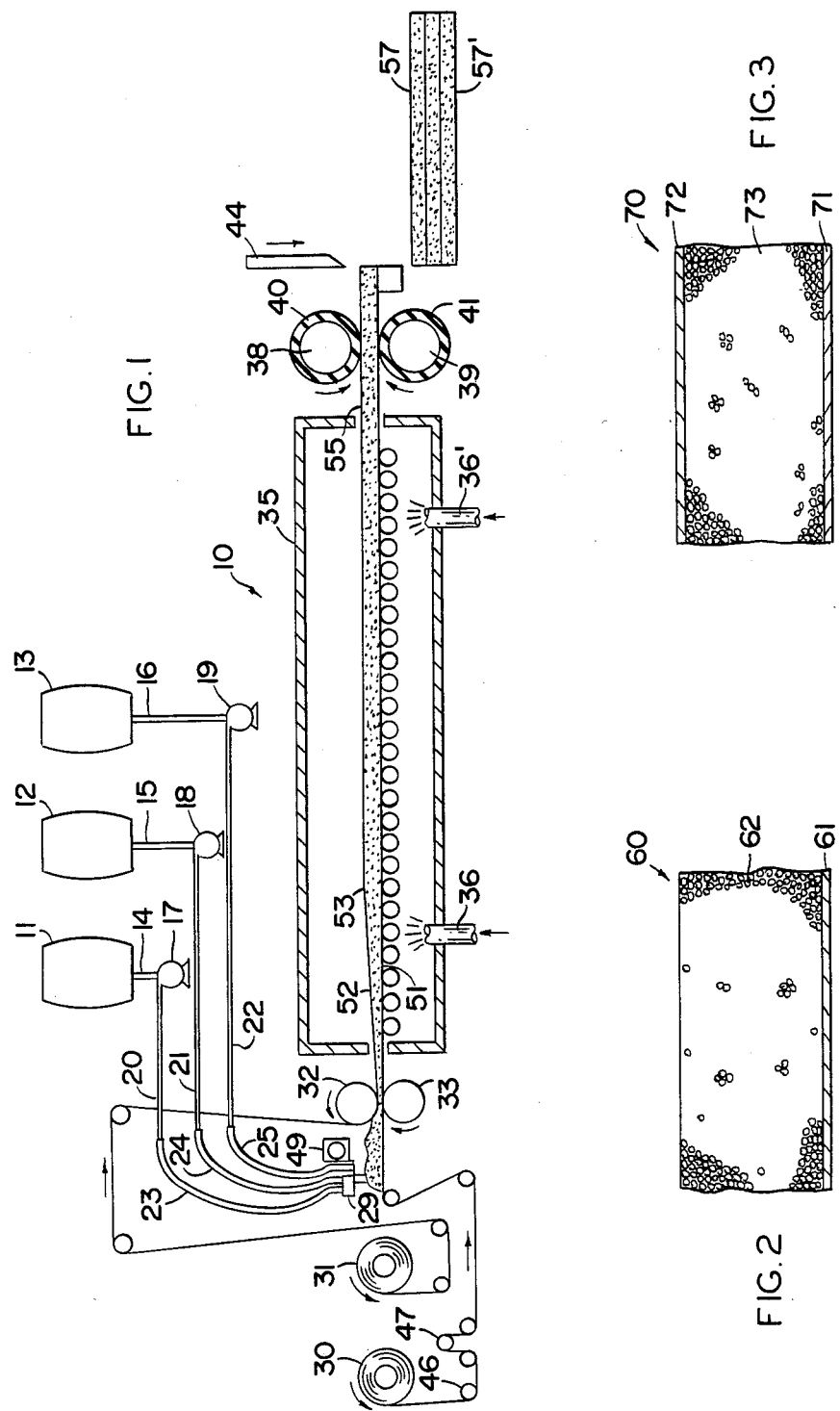

DISTILLED PRODUCTS OF POLYETHYLENE TEREPHTHALATE POLYMERS AND POLYCARBOXYLIC ACID-CONTAINING POLYOLS AND POLYMERIC FOAMS OBTAINED THEREFROM

BACKGROUND OF THE INVENTION

1. Field of the Invention

This invention relates to polyester polyols which are obtained by digesting scrap or recycled polyethylene terephthalate with polyols to form digested polyol mixtures and distilling ethylene glycol from the digested mixtures. The distilled polyols are useful in the preparation of cellular foam materials, particularly polyisocyanurate and polyurethane foams.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

U.S. Pat. No. 4,039,487, for example, discloses the use of aromatic polyester polyols to prepare polyisocyanurate foams. Although the foams of this patent have good fire resistance and low smoke evolution upon combustion, they have a relatively high friability. Furthermore, the polyols are comparatively expensive to manufacture.

U.S. Pat. No. 4,092,276 also discloses the use of rather costly aromatic polyester polyols in preparing polyisocyanurate foams. Another disadvantage of these foams is that they do not have especially high compressive strength. A further problem with using aromatic polyester polyols, particularly those of low molecular weight, is that the polyols tend to be solid at room temperature, or to be characterized by very high viscosity and poor solubility in resin mixtures, thus making them difficult to handle.

To remedy the above drawbacks, it has been proposed in U.S. Pat. No. 4,237,238 to use in the preparation of polyisocyanurate foams a minor amount of a cheap by-product type of liquid polyol mixture which is obtained by the transesterification, with a glycol of molecular weight from about 60 to 400, of a dimethyl terephthalate esterified oxidate reaction product residue. The polyisocyanurate foams produced are disclosed to be characterized by a high degree of fire resistance with low smoke evolution on combustion, a low foam friability and reasonably good compressive strength. U.S. Pat. No. 4,411,949 discloses cellular foams of exceptional quality producible by employing a polyol mixture derived from a by-product of dimethyl terephthalate production which has a substantially higher content of dimethyl terephthalate than the residue used in U.S. Pat. No. 4,237,238.

Another source of aromatic polyester polyols is available through the recovery of polyester wastes. High molecular weight polyesters of terephthalic acid and aliphatic dihydric alcohols are well known in the art. These high molecular weight polyesters, especially polyethylene terephthalate (PET), are used commercially for the manufacture of packaging film, fibers, electrical insulators, molded articles, such as PET beverage bottles, etc. The various manufacturing processes unfortunately generate considerable waste as the polyester is processed into commercial form. Also, the tremendous quantities of spent consumer goods containing the polyester constitute a huge supply of scrap polyester material.

There is a growing awareness of the need for energy conservation and the utilization of recyclable materials. It is realized that the judicious use of plastics can contribute significantly to energy savings. The industry has long recognized that recycling waste polyalkylene terephthalate would conserve raw materials, improve process economics, and eliminate the problem of waste disposal. Numerous processes have been proposed for recovering useful products from waste or scrap polyalkylene terephthalate by reducing or digesting the high molecular weight polymer to short-chain fragments. These short-chain fragments have been used principally in the production of additional polyester materials.

The use of a polyalkylene terephthalate digestion product in flexible polyurethane foam is described in U.S. Pat. No. 4,048,104. In this patent, the digestion product is employed to prepare polyisocyanate prepolymers, and not as a polyol ingredient in the manufacture of flexible polyurethane foam.

U.S. Pat. No. 4,223,068 discloses the manufacture of rigid polyurethane foam wherein 5 to 30 percent of the weight of the organic polyol used in the manufacture is a digestion product of polyalkylene terephthalate residues or scraps digested with organic polyols. The preparation of isocyanurate modified polyurethane foams utilizing a digestion product of polyalkylene terephthalate scrap dissolved in one or more organic polyols is described in U.S. Pat. No. 4,417,001. While these foams are characterized by desirable physical properties, deficiencies have been encountered in the fluidity and storage stability of polyol digestion products disclosed for use in preparing the foams. These deficiencies lead to inefficiency in the foam production.

One solution to the instability of the digestion products is to employ certain polycarboxylic acid components in the digestion of the scrap polyalkylene terephthalate, such as polyethylene terephthalate (PET), as disclosed in U.S. patent application Ser. No. 582,348, filed Feb. 22, 1984. However, cellular foams synthesized from the resulting improved digestion products have been found to be inferior in certain properties, e.g., foam density and thermal insulation capacity, to the generally acceptable foams of above-mentioned U.S. Pat. No. 4,411,949. It would be desirable if PET scrap could be utilized to produce an inexpensive polyol mixture having a good shelf stability for extended periods of time and the capacity to yield foamed products characterized by a broad range of desirable properties.

OBJECTS OF THE INVENTION

It is accordingly an object of the present invention to provide a storage stable polyol composition for use in preparing polymeric foam materials, particularly polyurethane and polyisocyanurate foams, of reduced friability, high thermal stability and compressive strength, and suitable density and reactivity, and a method of producing the polyol composition.

It is another object of the present invention to provide improved cellular foams, especially polyisocyanurate and polyurethane foams, having a combination of advantageous properties, including a reduced friability, and high thermal resistance, compressive strength, and insulation properties, and an improved method of producing the foams.

It is an additional object of the present invention to provide a polyol mixture having good storage stability, low viscosity, and a controllable equivalent weight for use in producing polyurethane and polyisocyanurate foams.

It is yet another object of the present invention to provide a polyol mixture for admixture with blowing agents to form compatible premixes for the preparation of polyurethane and polyisocyanurate foams.

It is still another object of the present invention to produce an improved polyisocyanurate foam material characterized by a high degree of fire resistance with low smoke evolution and flame spread on combustion, and the formation of a protective char over unburnt foam upon combustion.

It is a further object of the present invention to provide polyisocyanurate foams which are characterized by a high conversion to trimer.

It is a still further object of the present invention to provide closed cell polyisocyanurate and polyurethane foam materials which can be used in building panels which are highly insulating, thermally resistant, low in friability, soundproof and self-supporting.

These and other objects and advantages of the present invention will become more apparent by reference to the following detailed description and drawings wherein:

FIG. 1 is a side schematic representation of an apparatus suitable for producing a cellular foam material in accordance with the present invention;

FIG. 2 is a cross-sectional view of a laminated building panel having one facing sheet; and FIG. 3 is a cross-sectional view of a laminated building panel having two facing sheets.

DESCRIPTION OF THE INVENTION

The above objects have been achieved and the drawbacks of of the prior art have been overcome by the development of an improved polyester polyol, which is prepared by digesting polyethylene terephthalate (PET) with an organic polyol and distilling off ethylene glycol (EG) formed during the digestion reaction. Preferably, substantially all the liberated EG is distilled from the digested polyol mixture. The distillation of the invention is advantageously carried out to strip off EG formed in the depolymerization of the PET but to prevent re-equilibration of the digested PET with formation of more EG. This prevention or minimization of EG formation during distillation is accomplished by suitably selecting the distillation conditions, such as by rapidly conducting the distillation at reduced temperature and pressure in an appropriate device, e.g., a wiped film evaporator.

Accordingly, this invention relates to a process for preparing a polyol mixture by (1) depolymerizing PET with a polyol digesting medium to form a digested polyol mixture containing EG, and (2) distilling from the digested polyol mixture at least a portion and preferably substantially all of the EG formed in the depolymerization while preventing or minimizing the formation of further EG during the distillation.

The digestion of the PET is carried out under normal depolymerization conditions well known and described in the prior art. In a preferred embodiment, the digesting medium includes at least one glycol which is co-distillable with the EG. Advantageously, the quantity of digesting components is sufficient to produce a digested polyol having a desirably low equivalent weight, such as below about 120, before the distillation step. The distillation is carried out to strip off the amount of EG which will yield a polyol mixture having a prolonged storage stability and predetermined equivalent weight, and, when the digesting medium includes a distillable glycol, the portion of this distillable glycol which, in conjunction with the distilled EG, produces the polyol mixture having a prolonged storage stability and the desired equivalent weight.

The PET to be digested is available in the form of films, fibers, and shaped articles. In addition, PET is available as sludges which are obtained as cleanup by-products from PET manufacturing plants. The molecular weight of such PET material is at least about 15,000 and ranges upward to 100,000 or more. Lower molecular weight oligomers of PET also can be used.

According to the present invention the PET is depolymerized or degraded with digesting polyols which can be aliphatic, cycloaliphatic, aromatic, araliphatic and/or heterocyclic, and are preferably selected from the group consisting of diols and triols. Low molecular weight polyols such as aliphatic dihydric alcohols having from 2 to 16 carbon atoms are highly satisfactory. The molecular weight of the digesting polyol advantageously ranges from about 60 to about 500. Examples of suitable polyols include alkylene glycols and glycol ethers, such as ethylene, oxydiethylene, propylene, oxydipropylene, butylene, pentylene, hexylene, and octamethylene glycols, and isomeric forms thereof, and the polyoxyalkylene glycols such as polyoxyethylene and polyoxypropylene glycols, 1,4-bis-hydroxymethyl cyclohexane, dimethylol dicyclopentadiene, 1,3-cyclohexanediol, 1,4-cyclohexanediol, and in general hydroxy-terminated ethers, esters or mixed ether esters having a molecular weight of about 500 or less. The digesting polyols may, of course, be used as mixtures of two or more polyols. The polyols may include substituents which are inert in the digestion reaction, for example, chlorine and bromine substituents. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

In a preferred embodiment of the invention, the digesting medium contains a polycarboxylic acid component. The polybasic-carboxylic acid component may be aliphatic, cycloaliphatic, aromatic, araliphatic and/or heterocyclic and may be substituted, for example, with halogen atoms and/or may be unsaturated. The following are mentioned as examples: succinic acid, glutaric acid, adipic acid, suberic acid, azelaic acid, sebacic acid, citric acid, 1,4-cyclohexanedicarboxylic acid, trimellitic acid, tetrahydrophthalic acid anhydride, hexahydrophthalic acid anhydride, endomethylene tetrahydrophthalic acid anhydride, glutaric acid anhydride, phthalic anhydride, isophthalic acid, terephthalic acid, benzophenonetetracarboxylic acid dianhydride, maleic acid maleic acid anhydride, fumaric acid, and dimeric and trimeric fatty acids. Aromatic carboxylic acid compounds are particularly useful constituents of the digesting medium.

An especially satisfactory digested polyol mixture is obtained by digesting PET with a preferred polycarboxylic acid component-containing polyol, the polycarboxylic acid component having ring units with two

groups on adjacent (or ortho) or alternate (or meta) ring positions, the ring unit content of the polycarboxylic acid component being sufficient for improved storage stability of the digestion product. A preferred digesting polyol of the invention contains o-phthalic, isophthalic and/or trimellitic acid residues. By o-phthalic, isophthalic and trimellitic acid residues are meant the groups

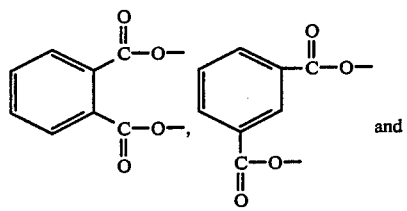 and

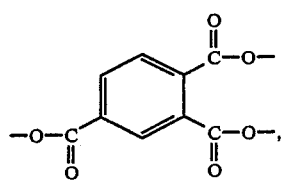

respectively.

In the digestion of PET with a polycarboxylic acid component-containing polyol, the digesting medium may comprise a polyol and a polycarboxylic acid or acid derivative, such as an anhydride or ester of the polycarboxylic acid. Since the digesting polycarboxylic acid component is converted to a polyester either before or at the beginning of the digestion process, the polycarboxylic acid component-containing polyol used in depolymerizing the PET can be defined as the reaction product of a mixture of digesting polycarboxylic acid and polyol components. The ingredients can be introduced in various ways in the digesting process. For example, all ingredients can be charged at the same time to the reacting vessel and thereupon reacted together. In a preferred method, the polycarboxylic acid or acid derivative is pre-reacted with a polyol to form a polyester polyol, and then the PET is digested by the pre-formed polyester polyol. In an alternative method, the PET first is reacted with a polyol, and the polycarboxylic acid or acid derivative thereof subsequently is added to the reactor and the reaction continued to completion. Various mixtures of digesting reactants, such as mixtures of diols, like diethylene glycol, dipropylene glycol, triethylene glycol, tripropylene glycol, tetraethylene glycol, tetrapropylene glycol, trimethylene glycol and tetramethylene glycol, and polyester polyols, like reaction products of mixtures of phthalic anhydride and said diols, can be introduced together to the reactor.

Advantageously, at least enough of a polycarboxylic acid component having the above-described ring residues with ortho or meta

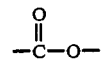

groups is included in the digesting medium for storage stability improvement of the resulting digestion product. The acid compounds containing the ring residues may be aromatic, cycloaliphatic, araliphatic and/or heterocyclic compounds, and preferably are aromatic. In addition to the two requisite

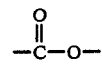

groups, the acid compounds may have additional

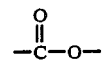

groups or —OH groups, and further may include substituents which are inert in the digestion reaction, for example, chlorine and bromine substituents. Compounds having more than one such ring residue, such as benzophenonetetracarboxylic dianhydride, can also be used.

Polycarboxylic acids or acid derivatives introduced in the digestion or depolymerization will be converted to esters during the process. Alternatively, the acids or acid derivatives can be pre-reacted to form esters and these esters then introduced in the depolymerization.

Examples of ring residue-containing acid compounds are phthalic anhydride, isophthalic acid, trimellitic anhydride, tetrahydrophthalic anhydride, tetrachlorophthalic anhydride, benzophenonetetracarboxylic dianhydride, tetrabromophthalic anhydride, 1,4,5,6,7,7-hexachloro-5-norbornene-2,3-dicarboxylic anhydride, and 1,8-naphthalic anhydride. The ring residue-containing acid compounds may be used in the depolymerization in conjunction with the other polybasic-carboxylic acid components mentioned above.

The digestion of the PET is conveniently carried out in the temperature range from about 150° to 290° C., preferably 190° to 235° C. Illustratively, the digestion or depolymerization can be conducted in the absence of a liquid reaction medium composed of material other than the digesting ingredients. The reaction suitably is performed under a flow of nitrogen and at atmospheric, subatmospheric or superatmospheric pressure for a period from about one hour to about ten hours. The stripping of EG and of distillable glycol(s) to produce the desired equivalent weight can be accomplished during and after the reaction. The digestion reaction can be carried out as a batch process or continuously, and is normally catalyzed. Generally, enough depolymerization or transesterification catalyst is added to the reaction mixture to suitably promote the reaction. Any conventional transesterification catalyst (single compound or mixture of compounds) can be used.

Some PET materials contain dispersed solids which can be catalyst particles (left over from the processing by which the terephthalate was produced); or may be pigments or other foreign substances. Such dispersed solids may remain in the digestion product, so long as they are substantially inert in the subsequent preparation of rigid polymeric foam. Although the digested polyol mixture of the invention generally can be employed without being filtered, it is often desirable to filter this mixture prior to its subsequent utilization in foam preparations.

In the broadest aspects of this invention, the digested polyol mixture prepared by reaction of the PET and polycarboxylic acid-containing polyol is distilled to strip off the EG derived from the PET and the other distillable glycols without regard to minimizing the formation of further EG, such as at a temperature of about 200°–300° C., a pressure of about 0.1 to 20 atmospheres, and a distillation time of about 1 to 10 hours. The amount of EG removed by the distillation may vary widely, such as from about 1% by weight of the digested polyol mixture up to the total amount of EG contributed by the PET, and preferably is sufficient to bring about significant improvement in the mixture's storage stability.

In a preferred embodiment of the invention, the distillation is performed after the depolymerization and conducted rapidly to prevent re-equilibration with formation of more EG. The distillation is preferably conducted at a temperature from about 100° to 300° C., more preferably about 120° to 180° C.; at a pressure from about 0.1 mm. to 760 mm., more preferably about 0.5 mm. to 50 mm.; and a distillation time of less than 60, more preferably less than 15, minutes. This rapid stripping can reduce the EG content to less than 5, preferably less than 0.5, weight % of the polyol mixture. Although the removal of EG can be accomplished by various distillation apparatuses provided the process design minimizes the possibility of re-equilibration, a wiped film evaporator is particularly effective for rapid distillation of the glycols without re-equilibration. A wiped film evaporator operated at a jacket temperature of about 120° to 140° C., a pressure of about 0.5 to 5 mm. Hg, and a contact time of less than 5 minutes has been found very effective.

The process of the invention may be efficiently conducted with recycling of the glycols distilled from the digested polyol mixture back to the depolymerization reaction mixture. This accomplishes an economical recycling and reuse of the distilled glycols and thereby avoids the need to otherwise recover them and find other uses or dispose of them.

In a preferred embodiment of the invention, the depolymerization is initiated by reacting the PET, which is composed of repeating ethylene glycol (EG) and terephthalic acid (TPA) molecules connected by ester linkages, with a polyol, such as diethylene glycol (DEG) and/or dipropylene glycol (DPG), in the presence of a catalyst, such as tetrabutyl titanate, until a solution of the PET is obtained. Then the acid component, such as phthalic anhydride (PA), or an ester thereof, such as the product of a catalyzed esterification reaction between PA and DEG and/or DPG, is added and the depolymerization is completed. In another preferred embodiment of the invention, the PET is added to a mixture of a polyol and a polyester polyol derived from the acid component, and the depolymerization is carried out. The proportions of PET to polyol to acid or derivative thereof may be varied to a considerable degree in accordance with the product desired. At all events, sufficient polyol and acid component should be used to form a polyester polyol having long-term storage stability and capable of efficiently polymerizing with organic polyisocyanates in the formation of rigid foams.

In the depolymerization of PET with DEG as the digesting glycol and PA as the digesting acid, the sum of DEG and PET moles represents the total glycol while the sum of PA and PET moles gives the total acid. In the case of PET, one repeat unit

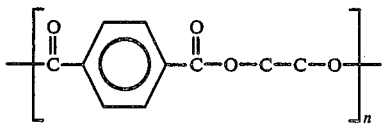

represents one EG mole and one terephthalic acid mole and weighs 192 g/unit. For generation of high molecular weight polyester (10,000–30,000 mw), the glycol to acid ratio must approach 1. For glycolysis of the high molecular weight PET, the reaction must be reversed; therefore, a large stoichiometric excess of glycol to acid is utilized. The heat and catalyst-induced reequilibration reaction produces low molecular weight oligomers (300–600 mw) of PA and terephthalate glycols and liberates a portion of the EG from the PET chain. The unincorporated DEG functions as a solvent.

Suitable proportions of reactants in the digestion may be as follows:
Equivalents of total polyol (digesting polyol, preferably DEG, +EG) to total acid (TPA+digesting polycarboxylic acid component, preferably PA)=1.5–10, preferably 2.1–4, to 1
Moles of PET to digesting polycarboxylic acid component, preferably PA=1.0–10, preferably 1.5–8, to 1
Moles of digesting polyol, preferably DEG, to EG=1-.8–2.5 to 1.
Since the storage stability of the polyol digestion product is enhanced by the presence of the ring unit-containing polycarboxylic acid component in the digesting medium, much lower PET:polycarboxylic acid component mole ratios, with an accompanying increase, if desired, in the amount of digesting polyol to maintain the equivalent weight, may of course be employed. However, the cost of the digestion product increases with increasing content of the stabilizing acid component. In an especially preferred digestion product from a commercial standpoint, the molar proportions are as follows:
Equivalents of total polyol (digesting polyol, preferably DEG, +EG) to total acid (TPA+digesting polycarboxylic acid component, preferably PA)=2.6 to 1
Moles of PET to digesting polycarboxylic acid component, preferably PA=2 to 1
Moles of digesting polyol, preferably DEG, to EG=2.5 to 1.

The digestion reaction liberates a certain amount of the EG from the PET. The ratios of total polyol to total acid and PET to digesting polycarboxylic acid component will determine the resulting polyol equivalent weight and the level of free EG. Polyols of low equivalent weight can be produced by using a suitable excess of a low molecular weight digesting glycol(s), such as those having a boiling point higher than ca. 200° C., e.g., DEG, for depolymerizing the PET. Distillation of a portion or substantially all of the free EG generated and a portion of the excess digesting glycol from these polyol digestion products will then generate polyols having the advantageously low equivalent weights attainable by the method of U.S. Pat. No. 4,411,949. The present invention permits use of a large excess of digesting glycol to generate low molecular weight polyester oligomers from the PET scrap and the removal of whatever amount of free or unreacted digesting glycol is required to yield the desired equivalent weight. The final equivalent weight also can be adjusted by adding polyol after the distillation step. Accordingly, it is possible to prepare polyol digestion products with a low equivalent weight and low viscosity and at the same time a reduced amount of residual digesting glycol. For example, the present invention requires less free DEG than in U.S. Pat. No. 4,411,949 to obtain polyols having the same equivalent weights. At an equivalent weight of 140, PET-based polyols of the invention are found to contain about 20% DEG, whereas typical polyols of U.S. Pat. No. 4,411,949 have about 25-28%.

The properties of the distilled polyol mixtures of the present invention fall within rather broad ranges. The viscosities (Brookfield) of the polyol mixtures measured in cps. at 25° C. fall within a rather broad range from about 500 to about 50,000, preferably about 500 to about 20,000, and most preferably about 700 to about 12,000; the hydroxyl number values fall within a range of from about 700 to about 120, preferably about 250 to about 600, and most preferably from about 300 to about 475; the acid number falls within a range of from about 0.2 to about 20 and preferably about 0.2 to about 10.

A most preferred distilled polyol mixture of the invention is prepared with a digesting medium derived from a polycarboxylic acid component, preferably phthalic anhydride, and a glycol, preferably diethylene glycol, and is characterized by a low free ethylene glycol content, e.g., less than 1%, preferably less than 0.5%, by weight, to provide suitably high foam densities. This distilled polyol has a free glycol (e.g., diethylene glycol) level in the 3 to 30, preferably 5 to 24, weight % range to maintain desired foam reactivity profiles. The free glycol (e.g., diethylene glycol) level and the equivalent weight of the distilled polyol are controlled by appropriate selection of reactant ratios and utilization of an adjustment procedure whereby an amount of glycol (e.g., diethylene glycol) is added to the polyol after its distillation. The equivalent weight of the distilled polyol is preferably 100-250, more preferably 125-225, grams/equivalent of OH.

The polyol mixtures of the present invention may be used in the preparation of both cellular and non-cellular polymers. The latter polymers, such as the polyisocyanurates and polyurethanes, can be prepared by using standard techniques known to those skilled in the art. The polyol mixtures are particularly useful in the preparation of polyisocyanurate foams and polyurethane foams. These foams can be prepared by mixing together the organic polyisocyanate with the polyol, catalyst and blowing agent at temperatures ranging from about 0° C. to 150° C.

The polyurethane foams can be prepared by reacting the polyol mixture of the invention and polyisocyanate on an essentially 1:1 to 1:1.2 equivalent basis. In an advantageous embodiment of the invention, the polyol mixture of the invention is employed in admixture with at least one other polyol to produce polyurethane foams. In this embodiment, the polyol mixture of the invention can comprise about 5 to 100, preferably about 20 to 50, weight percent of the total polyol content in the foam preparations. The polyisocyanurate foams of the invention are prepared by reacting the polyisocyanate with a minor amount of polyol, wherein the polyol digestion mixture comprises about 5 to 100 weight percent of the total polyol content in the foam preparations.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2, 4-diisocyanate, toluene-2,6-diisocyanate, mixtures of 2,4- and 2,6-toluene diisocyanate, hexamethylene-1,6-diisocyanate, tetramethylene-1, 4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4,4'-diisocyanate; the triisocyanates such as 4,4',4''-triphenylmethanetriisocyanate, polymethylenepolyphenyl isocyanate, toluene-2,4,6-triisocyanate: and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

The polyols which can be employed in combination with the polyol mixture of the invention in the preparation of the polyurethane and polyisocyanurate foam compositions include, for example, monomeric polyols, such as ethylene glycol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

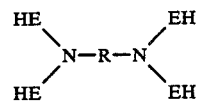

wherein R is an alkylene radical containing at least 2 to 6 carbon atoms and E is a polyoxyalkylene chain; amine based polyethers of the formula:

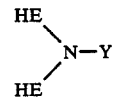

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used in combination with the polyol mixture of the invention. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basilic acid, thapsic acid, maleic acid, fumaric acid, glutaconic acid, isophthalic acid and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol) propane.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

Any blowing agent typically employed in similar prior art foam products containing polyisocyanurate and/or polyurethane linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Trichlorofluoromethane is a preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with a reactive hydrogen containing compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1, 3,3-tetramethylguanidine, N,N,N',N'-tetramethyl-1,3-butanediamine, N,N-dimethylethanolamine, N,N-diethylethanolamine, and the like. The catalysts generally comprise from 0.1 to 20, and preferably from 0.3 to 10, weight percent of the total composition.

Other additives may also be included in the foam formulations. Included are flame retardants, such as tris(2-chloroethyl)-phosphate, dispersing agents, plasticizers, fillers and pigments.

In a preferred rigid foam of the invention containing polyisocyanurate linkages, the organic polyisocyanate is polymethylene polyphenylisocyanate. The polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

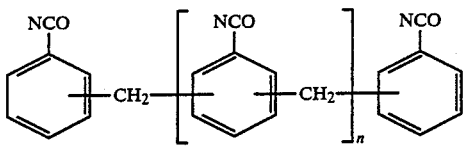

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisolcyanates is described in U.S. Pat. Nos. 2,683,730 to Seeger et al., and in 3,526,652 to Powers at column 3, lines 6–21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In order to ensure complete reaction, the polymethylene polyphenylisocyanate and the polyol are generally mixed in an equivalent ratio of 1.5:1 to 6:1 and preferably 2:1 to 5:1. In ranges outside these proportions the reaction yields a product having undesirable physical characteristics. At higher ratios the product has an undesirably high friability. At lower ratios the product has an undesirably high flammability.

In the preparation of these polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris(dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In the production of a laminate of a polyisocyanurate foam, the isocyanate tank 11 is charged with the organic polyisocyanate admixed with the blowing agent and the surfactant, and the polyol tank 12 is charged with the polyol mixture of the invention, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39, each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol mixture and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the over 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following and the temperature and pressure during that interval. Table I also reports the composition of the distillate collected during each distillation and characteristics of the digested polyol mixture removed from the flask after each distillation.

The Table I results show that over the course of the stripping procedure the distillate became enriched in DEG as its EG content lessened, and that the EG level in the stripped polyol mixture continually decreased to a final value of 0.5%.

TABLE I

| | VACUUM DISTILLATION RESULTS | | | | | | | | | | | | |
|---|---|---|---|---|---|---|---|---|---|---|---|---|---|
| | DISTILLATION CONDITIONS | | | DISTILLATE | | | | | POLYOL | | | | |
| DISTILLATION No. | Time, Min. | Pot Temp., °C. | Pressure, mm Hg | Wt., g | % EG | % DEG | % H₂O | No. | % EG | % DEG | % H₂O | Acid No. | Eq. Wt. | Viscosity cps 25° C. |
| 1 | 15 | 109–130 | 9–10 | 34 | 48.9 | 52.7 | .75 | 1 | 2.2 | 26.5 | .11 | 2.4 | 116 | — |
| 2 | 40 | 140–158 | 18–20 | 79 | 21.7 | 74.7 | .3 | 2 | 1.0 | 20 | .14 | 2.0 | 141 | — |
| 3 | 10 | 152–165 | 15–20 | 54.5 | 19.8 | 75.2 | 1.1 | 3 | .75 | 16 | .13 | 1.3 | 171 | — |
| 4 | 25 | 175 | 15 | 58 | 9.0 | 84.5 | .6 | 4 | .5 | 9.4 | .14 | 0.9 | 228 | 33000 | examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Preparation and Distillation of Digested Polyol

This example illustrates the preparation and distillation of a digested polyol mixture in accordance with the present invention.

To a 1 l resin kettle equipped with a stirrer, thermometer, inlet and outlet for nitrogen, Vigreaux column, reflux condenser and collector were added 500 g of diethylene glycol (DEG), 110 g of phthalic anhydride (PA), and ca. 1 ml of tetrapropyl titanate by means of a syringe. The ingredients were flushed with nitrogen, heated to 230° C. and held at this temperature until the water of reaction ceased to condense in the collector. At this point, 250 g of polyethylene terephthalate (PET) chips were added, and the temperature dropped to 180°–190° C. The charge had a total glycol:total acid mole ratio of 3.0 and a PET:PA mole ratio of 1.8. The temperature of the charge was again raised to 230° C. and held at this temperature for 1.5 hours.

The resultant polyol mixture had an acid number of 2.4, a free ethylene glycol (EG) content of 4.2%, a free DEG content of 27%, an H₂0 content of 0.39%, and an equivalent weight of 109.

The polyol mixture was charged into a vacuum distillation apparatus consisting of a 3 l round bottom flask equipped with stirrer, thermometer, condenser and calibrated collector. The temperature of the polyol mixture was brought to 100° C. and then a vacuum of about 10 to 20 mm Hg was established. A distillate of EG and DEG was collected in the calibrated receiver and then the vacuum was released to remove the distillate sample and a portion of the polyol mixture remaining in the 3 l flask. This distillation and sample removal procedure was repeated three more times. The overall procedure was completed in about 1.5 hours, with the temperature increasing over the course of the repeated distillation to a final value of about 175° C. The following Table I reports the time of each distillation interval

EXAMPLE 2

Preparation and Distillation of Digested Polyol

The digestion procedure of Example 1 was repeated to produce a polyol mixture having the following characteristics before distillation:

% EG Content: 4.3
% DEG Content: 26
% H₂O Content: 0.38
Acid Number: 2.1
Equivalent Weight: 108

Vacuum distillation of the polyol mixture for 70 minutes at 110°–145° C. and 10-15 mm Hg yielded a distillate and stripped polyol (Polyol No. 5) having the following characteristics:

| | DISTILLATE | | |
|---|---|---|---|
| Wt., g | % EG | % DEG | % H₂O |
| 116 | 30.4 | 69.5 | .37 |

| | | POLYOL | | | |
|---|---|---|---|---|---|
| % EG | % DEG | % H₂O | Acid No. | Eg. Wt. | Viscosity cps 25° C. |
| 5 | 19 | .13 | 1.8 | 141 | 1830 |

EXAMPLE 3

Vacuum Distillation of Digested Polyol

This example illustrates the effect of variation in distillation temperature and pressure on the stripped polyol mixture.

The digestion procedure of Example 1 was repeated except that 677 g of DEG, 100 g of PA, and 235 g of PET chips were used. This charge had a total glycol:total acid ratio of 4.0 and a PET:PA ratio of 1.8.

Vacuum distillation of the polyol mixture was carried out at the two pressure/temperature levels shown in the following Table II. The Table II results show that both stripped polyols had the same equivalent weight, but the EG and DEG contents and viscosities of the polyols were different, implying that some re-equilibration occurs during the distillation.

TABLE II

EFFECT OF DISTILLATION TEMPERATURE AND PRESSURE

| DISTILLATION | DISTILLATION CONDITIONS | | | | POLYOL | | | | |
|---|---|---|---|---|---|---|---|---|---|
| | Time, | Pot Temp., °C. | | Pressure, | | | | Eq. | Viscosity |
| No. | Min. | Initial | Final | mm Hg | No. | % EG | % DEG | Wt. | cps 25° C. |
| 1 | 50 | 122 | 153 | 9–11 | 6 | .1 | 8.5 | 182 | 3860 |
| 2 | 50 | 130 | 162 | 19–20 | 7 | .3 | 10.9 | 184 | 5120 |

EXAMPLE 4

Re-equilibration of Digested Polyol

This example illustrates the effect of further heating on stripped polyol mixtures after vacuum distillation.

After distillation of Polyol No. 6 of Example 3, the vacuum was released but the polyol was further heated at 160°–170° C. for an additional 60 minutes. The following Table III shows the EG and DEG contents of polyol samples taken during this additional heating and the initial and final equivalent weights and viscosities of the polyol mixture.

Another polyol mixture (Polyol No. 8) was prepared and vacuum distilled according to the general procedure followed for Polyol No. 6, except that 640 g of DEG, 112 g of PA, and 261 g of PET chips were used (a total glycol:total acid ratio of 3.5 and a PET:PA ratio of 1.8), and the distillation was conducted for 30 minutes at a temperature of 145°–150° C. and a pressure of 10 mm. Hg.

After distillation, the vacuum was released but the polyol was further heated at 145°–150° C. for an additional 60 minutes. EG and DEG contents of polyol samples taken during this period and the initial and final equivalent weights and viscosities of the polyol mixture are shown in Table III.

No change in equivalent weight was observed for Polyol Nos. 6 and 8. However, their EG and DEG levels and viscosities increased with time. The DEG level increased 70% at 160°–170° C., and 20% at 145°–150° C., while the viscosities increased 50% and 7% at the respective temperatures.

These results show that a reshuffling of molecules occurs even at temperatures well below reaction temperature.

TABLE III

RE-EQUILIBRATION OF POLYOL AFTER VACUUM DISTILLATION

| Polyol No. | Time After Vacuum Release, Min. | % EG | % DEG | Eq. Wt. | Viscosity, cps 25° C. |
|---|---|---|---|---|---|
| 6 | 0[1] | .1 | 8.5 | 182 | 3860 |
| | 0[2] | .22 | 10 | — | — |
| | 15 | .62 | 13.5 | — | — |
| | 30 | .76 | 13.6 | — | — |
| | 45 | .83 | 14.3 | — | — |
| | 60 | 1.0 | 14.6 | 184 | 5900 |
| 8 | 0[1] | .2 | 10.9 | 174 | 3920 |
| | 0[2] | .02 | 11.1 | — | — |
| | 15 | .31 | 11.7 | — | — |
| | 30 | .46 | 12.7 | — | — |
| | 45 | .70 | 12.7 | — | — |
| | 60 | .80 | 13.3 | 170 | 4200 |

[1] At the end of the vacuum distillation.
[2] At the beginning of the 60 minute heating period.

EXAMPLE 5

Preparation of Unstripped Digested Polyol

This example illustrates the preparation of a comparative digested polyol mixture without any distillation of the mixture after digestion.

The digestion procedure of Example 1 was repeated except that 440 g of DEG, 130 g of PA, and 300 g of PET chips were used. This charge had a total glycol:total acid ratio of 2.3 and a PET:PA ratio of 1.8, and yielded a digested polyol (Polyol No. 9) having a free EG content of 3.6%, a free DEG content of 17.2%, an equivalent weight of 135, and a viscosity of 1400 cps at 25° C.

EXAMPLE 6

Wiped Film Evaporation of Digested Polyol Mixture

This example illustrates the use of a wiped film evaporative concentrator for rapid vacuum distillation of the digested polyol mixture to prevent re-equilibration of the mixture.

A digested polyol mixture was prepared according to the procedure of Example 1 except that 580 g of DEG, 148 g of PA, and 346 g of PET chips were used. This charge had a total glycol:total acid ratio of 2.6 and a PET:PA ratio of 1.9.

The resultant digested polyol mixture, which had an equivalent weight of 117, was filtered and distilled by means of a Pope Scientific 2" concentrator/evaporator equipped with a variable speed drive, digital RPM indicator, and an Omega Engineering temperature controller. Distillation was performed with a jacket temperature of 180° C., a vacuum of ca. 22 mm Hg, and a flow rate of about 0.25 g/sec. to yield a product (Polyol No. 10) having a free EG content of <0.5%, a free DEG content of 17.5%, an equivalent weight of 146, and a viscosity of 1630 cps at 25° C.

Additional DEG was blended with Polyol No. 10 to give the three following polyol mixtures:

| Polyol No. | % EG | % DEG | Eq. Wt. |
|---|---|---|---|
| 11 | <.5 | 23.5 | 130 |
| 12 | <.5 | 21.0 | 135 |
| 13 | <.5 | 19.5 | 140 |

EXAMPLE 7

This example illustrates the synthesis of polyisocyanurate foams utilizing comparative and inventive polyol mixtures.

The following quantities of the following ingredients were combined as indicated below.

| Item | Ingredient | Quantity (parts by weight) |
|---|---|---|
| A | Polymethylene polyphenyl | 220 |

-continued

| Item | Ingredient | Quantity (parts by weight) |
|------|------------|----------------------------|
|      | isocyanate[1] |  |
| B    | Polyol of Table IV | 80 |
| C    | 2,4,6-tris(dimethylaminomethyl) phenol[2] | (See Table IV) |
| D    | Potassium-2-ethyl hexoate[2] | " |
| E    | Diethylene glycol[2] | " |
| F    | CFCl$_3$ | 55 |
| G    | Surfactant[3] | 2 |

[1]Item A has an equivalent weight of 138, an acidity of 0.03% HCl, and a viscosity of 2000 centipoises at 25° C. and is available from the Mobay Chemical Company, Pittsburgh, Pa. under the trade name MONDUR MR-200.
[2]Items C and D are employed in the form of a solution in the diethylene glycol (item E) in a 7.7:32:60 weight ratio of C:D:E.
[3]Item G is a surfactant supplied by Jim Walter Resources, Inc. under the trademark Foamstab 100.

In each foam preparation, items A, F and G were premixed and cooled to 15° C. To this mixture were added 80 parts of item B and the catalyst amount shown in Table IV. All ingredients were then stirred for a few seconds and poured into a 12"×12"×6" box, yielding a polyisocyanurate foam.

Various characteristics of the foams produced are shown in the following Table IV. Foams A and D were prepared using Foamol 250, a commercial transesterified by-product fraction from the manufacture of dimethyl terephthalate supplied by Jim Walter Resources, Inc. under the trademark Foamol 250. A comparison of Foams A-C shows that the removal of EG from the polyol increases the foam density to a desirably high value comparable to that of Foam A prepared with Foamol 250. Removal of the EG also results in a beneficial lowering of foam thermal conductivity.

The data for Foams D-H reveal that the foam density increases as the equivalent weight of the polyol employed increases; however, all foam samples are comparable in density to comparative foam D derived from Foamol 250. Additionally, while the thermal conductivities for inventive Foams E-H are about the same as those of the comparative foams, the inventive foams from PET-based polyols have lower friabilities than the comparative foams made with Foamol 250.

EXAMPLE 8

This example illustrates the preparation of digested polyol mixtures and their distillation in general accordance with the procedure of Example 6, utilizing phthalic anhydride (PA) and two anhydrides of higher functionality, viz., trimellitic anhydride (TMA) with a functionality of 3 and benzophenone tetracarboxylic dianhydride (BTDA) with a functionality of 4, as the digesting polycarboxylic acid components.

Three inventive polyol mixtures (Nos. 14, 16 and 18 of Tables V and VI below) were prepared, as well as comparative polyol mixtures Nos. 15, 17 and 19, respectively, of these tables. Each comparative polyol was directly synthesized without removal of the liberated EG to have approximately the same equivalent weight as the respective inventive polyol. This result was achieved by suitable adjustment of the component ratios employed in preparing the comparative polyols to yield the desired equivalent weight.

The following Table V reports the amounts of the ingredients used to make the polyols, the % EG and DEG before and after stripping in the case of the inventive polyols, and various characteristics of the polyols, including their shelf stability at room temperature.

TABLE V

| DISTILLED AND UNDISTILLED POLYOLS | | | | | | |
|---|---|---|---|---|---|---|
| POLYOL NO. | 14 | 15 | 16 | 17 | 18 | 19 |
| PET/Acid Ratio | 1.92 | 1.92 | 3.15 | 3.15 | 7.15 | 7.15 |
| Glycol/Acid Equivalent Ratio | 2.6 | 1.85 | 3 | 1.75 | 3.5 | 1.95 |
| Ingredients (pts. by wt.): | | | | | | |
| DEG | 690 | 425 | 600 | 270 | 614 | 265 |
| PA | 170 | 170 | — | — | — | — |
| TMA | — | — | 100 | 100 | — | — |
| BTDA | — | — | — | — | 75 | 75 |
| PET | 425 | 425 | 315 | 315 | 320 | 320 |
| % EG - Initial | 4 | 2.9 | 4.1 | 2.5 | — | 4.1 |
| After Stripping | .5 | — | .5 | — | 1.1 | — |
| % DEG - Initial | 21 | 9.4 | 26.4 | 7.1 | — | 10.4 |
| After Stripping | 12.4 | — | 6.8 | — | 15.4 | — |
| Viscosity, cps. 25 C. | 3300 | 7000 | 16000 | 54000 | 4900 | 24000 |
| Equivalent Weight, (g/OH) | 175 | 176 | 188 | 193 | 160 | 153 |
| Stability, 25° C. Days | | | | | | |
| 1 | clear | clear | clear | clear | clear | hazy |
| 7 | clear | hazy | clear | hazy | clear | hazy |
| 30 | clear | very hazy | clear | very hazy | clear | very hazy |
| 180 | clear | ppt. formed | clear | — | clear | — |

TABLE IV

| EVALUATION OF POLYOL IN POLYISOCYANURATE FOAMS | | | | | | | | | | |
|---|---|---|---|---|---|---|---|---|---|---|
| | POLYOL | | | | Viscosity | Catalyst | FOAM | | | |
| FOAM | No. | % EG | % DEG | Eq. Wt. | cps 25° C. | Wt. | Cream Time, sec. | Firm Time, sec. | Density pcf | Initial k-factor[1] | Friability %[2] |
| A | Foamol 250 | — | 25–29 | 134 | 1500–2500 | 8 | 31 | 56 | 1.72 | .128 | 22 |
| B | 9 (of Ex. 5) | 3.6 | 17.2 | 135 | 1400 | 10 | 41 | 81 | 1.52 | .147 | 25 |
| C | 5 (of Ex. 2) | 0.5 | 19 | 141 | 1800 | 8 | 28 | 53 | 1.72 | .139 | 19 |
| D | Foamol 250 | — | 25–29 | 134 | 1500–2500 | 9.1 | 25 | 49 | 1.85 | .130 | 17 |
| E | 11 (of Ex. 6) | <.5 | 23.5 | 130 | — | 9.9 | 23 | 42 | 1.77 | .135 | 11 |
| F | 12 (of Ex. 6) | <.5 | 21.0 | 135 | — | 9.9 | 22 | 42 | 1.80 | .131 | 15 |
| G | 13 (of Ex. 6) | <.5 | 19.5 | 140 | — | 10.4 | 21 | 40 | 1.81 | .132 | 10 |
| H | 10 (of Ex. 6) | <.5 | 17.5 | 146 | 1630 | 10 | 24 | 45 | 1.84 | .136 | 12 |

[1]Units = Btu-in/hr-ft$^2$-°F.
[2]According to ASTM Test Method C-421.

The following Table VI reports the compositions and stabilities of three inventive (containing Polyol Nos. 14, 16 and 18) and three comparative premixes (containing Polyol Nos. 15, 17 and 19) formulated for use in preparing polyurethane foams.

TABLE VI

PREMIX COMPATIBILITY RESULTS

| INGREDIENTS (pts. by wt.): | | | | | | |
|---|---|---|---|---|---|---|
| Voranol-446 (Sucrose polyol) | 35.7 | 35.7 | 35.7 | 35.7 | 35.7 | 35.7 |
| Fyrol 6 (fire retarding polyol) | 7.1 | 7.1 | 7.1 | 7.1 | 7.1 | 7.1 |
| Freon 11B | 28.6 | 28.6 | 28.6 | 28.6 | 28.6 | 28.6 |
| Polyol No. | | | | | | |
| 14 | 28.6 | — | — | — | — | — |
| 15 | — | 28.6 | — | — | — | — |
| 16 | — | — | 28.6 | — | — | — |
| 17 | — | — | — | 28.6 | — | — |
| 18 | — | — | — | — | 28.6 | — |
| 19 | — | — | — | — | — | 28.6 |
| Stability, 25° C. Days | | | | | | |
| Initial | clear | cloudy | clear | hazy | clear | emulsion |
| 14 | clear | very cloudy | small ppt. | very hazy | clear | ppt. formed |
| 30 | clear | ppt. formed | ppt. formed, upper layer clear | ppt. formed, upper layer cloudy | ppt. formed, upper layer clear | large ppt. formed |

The Table V results show that the inventive process yields two advantages with respect to polyol characteristics. The use of excess digesting glycol followed by distillation at low temperature gives a lower viscosity polyol with a better shelf stability as compared to the directly synthesized comparative product. Higher functionality anhydrides also produce stable polyols if the inventive process is employed. In addition, the higher functionality anhydrides provide stability at higher PET/acid ratios as compared to PA.

As shown in Table VI, the inventive polyols also display better stability in a urethane premix as compared to the directly synthesized polyols.

The above inventive premixes can be used in the production of polyurethane foams according to conventional methods known to those skilled in the art.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:

1. A process for preparing a polyester polyol mixture comprising
   (a) digesting polyethylene terephthalate with a digesting medium comprising a polycarboxylic acid component-containing polyol derived from a digesting polycarboxylic acid component and a digesting polyol component to form a digested polyol mixture and liberate ethylene glycol from said polyethylene terephthalate, and
   (b) distilling from said digested polyol mixture the amount of liberated ethylene glycol sufficient for improved storage stability of the mixture.

2. The process of claim 1 wherein said polycarboxylic acid component-containing polyol includes at least one glycol which is co-distillable with said liberated ethylene glycol, and said distillation step (b) is conducted to distill from said digested polyol mixture the amount of liberated ethylene glycol and codistillable glycol sufficient for improved storage stability of the mixture.

3. The process of claim 2 wherein said distillation step (b) is conducted rapidly at reduced temperature and pressure to prevent or minimize the liberation of further ethylene glycol from said polyethylene terephthalate during the distillation.

4. The process of claim 3 wherein said digesting polycarboxylic acid component is a member selected from the group consisting of phthalic anhydride, phthalic acid, isophthalic acid, trimellitic anhydride, trimellitic acid, benzophenonetetracarboxylic dianhydride, esters of said polycarboxylic acid components and mixtures thereof, and said digesting polyol component is a member selected from the group consisting of diethylene glycol, dipropylene glycol, mixtures of said glycols and mixtures of said glycols with at least one other oxyalkylene glycol.

5. The process of claim 3 wherein the glycols distilled in said step (b) are recycled to said step (a).

6. A polyester polyol mixture comprising the reaction product obtained by
   (a) digesting polyethylene terephthalate with a digesting medium comprising a polycarboxylic acid component-containing polyol derived from a digesting polycarboxylic acid component and a digesting polyol component to form a digested polyol mixture and liberate ethylene glycol from said polyethylene terephthalate, and
   (b) distilling from said digested polyol mixture the amount of liberated ethylene glycol sufficient for improved storage stability of the mixture.

7. The polyester polyol mixture of claim 6 wherein said polycarboxylic acid component-containing polyol includes at least one glycol which is co-distillable with said liberated ethylene glycol, and said distillation step (b) is conducted to distill from said digested polyol mixture the amount of liberated ethylene glycol and co-distillable glycol sufficient for improved storage stability of the mixture.

8. The polyester polyol mixture of claim 7 wherein said distillation step (b) is conducted rapidly at reduced temperature and pressure to prevent or minimize the liberation of further ethylene glycol from said polyethylene terephthalate during the distillation.

9. The polyester polyol mixture of claim 8 wherein said digesting polycarboxylic acid component has aromatic ring units with two

groups on adjacent or alternate ring positions.

10. The polyester polyol mixture of claim 9 wherein said digesting polyol component is a member selected from the group consisting of diethylene glycol, dipropylene glycol, mixtures of said glycols and mixtures of said glycols with at least one other oxyalkylene glycol.

11. The polyester polyol mixture of claim 10 wherein said digesting polycarboxylic acid component is a member selected from the group consisting of phthalic anhydride, phthalic acid, isophthalic acid, trimellitic anhydride, trimellitic acid, benzophenonetetracarboxylic dianhydride, esters of said polycarboxylic acid components and mixtures thereof.

12. The polyester polyol mixture of claim 11 wherein said digesting polycarboxylic acid component is a member selected from the group consisting of phthalic anhydride, esters of phthalic anhydride and mixtures thereof, and said digesting polyol component is diethylene glycol.

13. The process of claim 3 wherein substantially all of the ethylene glycol formed in the digestion is distilled from said digested polyol mixture, and additional polyol is optionally added after said distillation step (b) to yield the desired equivalent weight of the mixture.

14. The process of claim 13 wherein said digestin polycarboxylic acid component is a member selected from the group consisting of phthalic anhydride, phthalic acid, isophthalic acid, trimellitic anhydride, trimellitic acid, benzophenonetetracarboxylic dianhydride, esters of said polycarboxylic acid components and mixtures thereof, and said digesting polyol component is a member selected from the group consisting of diethylene glycol, dipropylene glycol, mixtures of said glycols and mixtures of said glycols with at least one other oxyalkylene glycol.

15. The process of claim 14 wherein said digesting polycarboxylic acid component is pre-reacted with said digesting polyol component before said digestion step (a).

16. The polyester polyol mixture of claim 8 wherein in the digestion reaction the ratio of equivalents of total polyol to equivalents of total acid is 1.5-10 to 1, the ratio of moles of said polyethylene tere phthalate to moles of said digesting polycarboxylic acid component is 1.0-10 to 1, and the ratio of moles of said digesting polyol component to moles of ethylene glycol in said polyethylene terephthalate is 1.8-2.5 to 1.

17. The polyester polyol mixture of claim 16 wherein said polyester polyol mixture has a viscosity in cps at 25° C. of about 700 to 12,000, a hydroxyl number of about 300 to 475, and an acid member of about 0.2 to 10.

18. The polyester polyol mixture of claim 8 wherein substantially all of the ethylene glycol formed in the digestion is distilled from said digested polyol mixture, and additional polyol is optionally added after said distillation step (b) to yield the desired equivalent weight of the mixture.

19. The polyester polyol mixture of claim 18 wherein said digesting polycarboxylic acid component is a member selected from the group consisting of phthalic anhydride, phthalic acid, isophthalic acid, trimellitic anhydride, trimellitic acid, benzophenonetetracarboxylic dianhydride, ester of said polycarboxylic acid components and mixture thereof, and said digesting polyol component is a member selected from the group consisting of diethylene glycol, dipropylene glycol, mixtures of said glycols and mixtures of said glycols with at least one other oxyalkylene glycol.

20. The polyester polyol mixture of claim 19 wherein said digesting polycarboxylic acid component is pre-reacted with said digesting polyol component before said digestion step (a).

21. The polester polyol mixture of claim 20 wherein in the digestion reaction the ratio of equivalents of total polyol to equivalents of total acid is 1.5-10 to 1, the ratio of moles of said polyethylene terephthalate to moles of said digesting polycarboxylic acid component to 1.0-10 to 1, and the ratio of moles of said digesting polyol component to moles of ethylene glycol in said polyethylene terephthalate is 1.8-2.5 to 1.

22. The polyester polyol mixture of claim 21 wherein said polyester polyol mixture has a viscosity in cps at 25° C. of about 700 to 12,000, a hydroxyl number of about 300 to 475, and an acid number of about 0.2 to 10.

* * * * *